(12) United States Patent
Previero

(10) Patent No.: US 6,216,880 B1
(45) Date of Patent: Apr. 17, 2001

(54) FILTER DEVICE FOR FLOWABLE PLASTIC MATERIAL

(75) Inventor: Flavio Previero, Albese Con Cassano (IT)

(73) Assignee: Previero N. S.R.L., Alzate Brianza (IT)

( * ) Notice: Subject to any disclaimer, the term of this patent is extended or adjusted under 35 U.S.C. 154(b) by 0 days.

(21) Appl. No.: 09/362,100

(22) Filed: Jul. 28, 1999

(30) Foreign Application Priority Data

Jul. 28, 1998 (IT) .............................................. MI98A1740

(51) Int. Cl.⁷ .......................... B01D 33/00; B01D 33/48
(52) U.S. Cl. ..................... 210/359; 210/390; 210/429; 210/432; 210/433.1; 210/435; 210/498
(58) Field of Search ........................... 210/359, 340–341, 210/387, 390, 429, 432, 234, 498, 455, 418, 236, 433.1, 435; 425/197–199

(56) References Cited

U.S. PATENT DOCUMENTS

| | | | |
|---|---|---|---|
| 3,855,126 | * 12/1974 | Smith | ................................... 210/780 |
| 3,856,277 | * 12/1974 | Tiramani . | |
| 3,940,335 | 2/1976 | Kalman . | |
| 4,025,434 | 5/1977 | Mladota . | |
| 4,159,953 | 7/1979 | Paquette . | |
| 4,167,384 | 9/1979 | Shirato et al. . | |
| 4,358,262 | 11/1982 | Herbert . | |
| 4,701,118 | 10/1987 | Koching et al. . | |
| 4,752,386 | * 6/1988 | Schulz et al. | ......................... 210/108 |
| 4,842,750 | 6/1989 | Britchi . | |
| 4,849,113 | * 7/1989 | Hills | ...................................... 210/741 |
| 5,141,631 | * 8/1992 | Whitman | ............................... 210/108 |
| 5,527,499 | * 6/1996 | Miley . | |
| 5,578,206 | * 11/1996 | Ogoshi et al. | ......................... 210/236 |
| 5,603,828 | * 2/1997 | Ishida et al. | .......................... 210/239 |
| 5,779,898 | * 7/1998 | Schwanekamp et al. | ............ 210/324 |

FOREIGN PATENT DOCUMENTS 1 446 710  8/1976  (GB) .

* cited by examiner

*Primary Examiner*—W. L. Walker
*Assistant Examiner*—Marianne Ocampo
(74) *Attorney, Agent, or Firm*—Young & Thompson

(57) ABSTRACT

A filter device for separating particulate material from a stream of flowable plastics; the device comprises a body member having at least a filter chamber and a flow path extending between inlet and outlet sides. A filter band transversely extends in said filter chamber, across the flow path, being supported by a back-plate having a perforated area. An axially movable valving member comprising a flow passage for the plastic material, is provided into the chamber, and an actuator to axially move the valving member between an advanced and a retracted position in which the valving member connects respectively disconnects the flow passage from the inlet or the outlet sides of the device, and for sealingly clamping the filter band peripherally around the perforated area of the back-plate.

9 Claims, 9 Drawing Sheets

FILTER DEVICE FOR FLOWABLE PLASTIC MATERIAL

BACKGROUND OF THE INVENTION

The present invention relates to a filter device for separating unwanted particulate material from molten or flowable plastic material, such as thermoplastic polymer, wherein a stream of plastic material having particles, such as dirt, lumps and/or carbonised polymer entrained therein, is fed to the inlet side of the filter device, for processing.

More precisely the invention relates to an automatic screen changer particularly suitable for production of pellets in recycling of plastics, in which use is made of a filter element comprising a filter band or wire net which is step advanced or moved throughout a filter chamber, across a flow path for the plastic material to be processed and cleaned from the unwanted particles.

RELATED PRIOR ART

It is known that in recycling plants for recovery of plastics, in particular polymer regeneration plants, filtration assemblies capable of ensuring the homogeneity and the purity of the processed material are increasingly required. It is therefore usual practice to dispose a filter element across the stream of molten plastic material, at the outlet side of an extruder to remove the particulate material mixed therein.

As the filter retain more and more of the filtered particles, whatever filtering element is adopted inevitably the same becomes soiled and clogged, thus requiring replacement of the clogged filtering element with a new clean one.

Many types of filtering devices in the past have been proposed for plastic materials, in which the replacement of the filtering element is performed by different procedures, according to whether the filter device is of the slide plate type or of counter-flow type; desirably, changing of the filter should not interfere or negatively affect the working of a plant, and should be performed in a very short time.

Furthermore, in plants for the recovery of waste plastics, in which the economical value of the recovered material is very poor, the automation or the use of automatic screen changers requires filter devices having a simple design and low cost, involving a limited number of operators for the maintenance and use.

Filter devices of the slide type are described for example in U.S. Pat. No. 4,167,384, U.S. Pat. No. 4,358,262 and U.S. Pat. No. 4,701,118; according to these documents a slider or each slider carries one or more filter packs that can be reciprocated between a first position in which the filter or filters register with a flow path for the molten plastic material, and one additional position in which the filter or filters are made accessible for inspection and/or substitution thereof.

Although in this type of device the change of the filter can be made in a very short time, nevertheless the change of a filter involves many problems in the processing of the plastic materials, particularly due to a large quantity of air entrained into the highly viscous flow of plastic material, by the perforations of a back-plate during the displacement across the flow path. Entrainment of air causes bubble formation i affecting the flow of the plastic material downstream the filter device; pre-filling of perforations of the back-plate as suggested by U.S. Pat. No. 4,025,434, partially solve the air problem only. In fact, due to the necessity to remove each clogged filter from the slide plate at a very high temperature by an operator, the change of the filter can not be automatically performed and involves some risks for the same operator; in conclusion this type of filter devices did not proved to be suitable for a practical use in the recovery of plastic materials, owing to the problems arising at the changing of the filter and for the involved high costs.

In an attempt to partially automate the change operation of the filter, preventing the breaking of the flow, the use of filter devices has been suggested provided with two or more flow-paths arranged in parallel between inlet and outlet sides; when an appropriate pressure sensing device indicates that a filter is clogged, the flow-path is-closed by a valving member to shut down the pressure, in order to allow for the replacement of the clogged filter element with a new one, while the flow of plastic material is continued in the remaining path or paths; the use of pressure sensing means does not provide any useful remedy to the disadvantages of this known type of filter devices.

Finally, U.S. Pat. No. 3,940,335 and U.S. Pat. No. 4,159,953 suggest the use of a filter device or filter apparatus in which a filter band is step moved on a reciprocable back-plate, across the molten stream of the plastic material; the filter band is passed through inlet and outlet apertures which are sealed, for example, by thermal solidification therein of the filtered material, to prevent air entrance and leakage of the same material after the filter band being advanced to locate a fresh part thereof into the flow-path.

Apart the use of a reciprocable back-plate, which again will entrain air as in the previously known filter devices, the sealing at the inlet and outlet apertures for the filter band by the solidified material involve new problems for the high share forces acting on the filter-band during any advancement. Again these filter devices do not solve the problem of a complete automation of the filter change operation, and require the use of wire nets which must be sufficiently strong to resist to the share forces. This type of filter proved to be not suitable or advisable for the use in plastic recovery systems, for example in the production of plastic pellets, in which use must be made of a very simple and low-cost filter device, allowing a complete automation.

In the attempt to provide a solution to the above mentioned problems, U.S. Pat. No. 4,842,750 which constitutes the closest prior art, suggests the use of a filter apparatus for cleaning viscous materials, and more a particular molten down scraps of synthetic materials, comprising a screen in the form of a strip which can be moved across the flow of plastic material to replace a clogged area of the filter strip with a fresh one; braking and sealing means are provided on both sides of the strip to prevent leakage. Furthermore, in order to prevent synthetic material form escaping when the filter strip is advanced, the volume of a chamber up-stream the screen is enlarged, for example by axially moving tubular members in the flow-path or by any suitable means, to reduce or eliminate the pressure upon the screen; therefore the filter strip can be easily advanced avoiding any leakage of molten plastic material.

Apart breakage of the flow of plastic material during replacement and advancement of the clogged strip, the proposed solution requires a very complex and costly filter device; furthermore the use of breaking and sealing devices on both sides of the filter strip substantially hinder the total removal of the thick layer of the particulate material on the upstream side of the filter strip, involving loss of material.

OBJECT OF THE INVENTION

Therefore the need for a filter device or automatic screen changer of simple design and low cost steel exist.

Accordingly, an object of the present invention is to provide a filter device or automatic screen changer of the continuous filter band type, which is suitable for solving the problems mentioned above and for use in the processing of plastic materials, for example for the production of pellets in plastics recovery plants.

Another object of the present invention is to provide a filter device of the type mentioned above which ensures, in a very simple manner, a perfect peripheral seal around a filtering area of the filter band, allowing at the same time an easy and rapid step advancement of the band for the replacement of a clogged filtering area with fresh one, without manual intervention by an operator, and without breaking the flow of material during a change.

Another object of the invention is to provide a filter device of the type mentioned above, in which the replacement of a clogged area of the filter may be performed without any risk of leakage, assuring at the same time to suitably shape the filtering area and to freely move the band across a filter chamber of the device for a complete removal of the particulate material retained on one side of the filter band.

BRIEF DESCRIPTION OF THE INVENTION

According to an aspect of the invention, a filter assembly or filter device for molten plastic material has been provided comprising: at least one flow-path which extends from an inlet to an outlet side of the device, and a filter element within a filter chamber for the removal of particle material from the flow of plastic material fed along said flow-path, wherein said filter element is of the continuous screen type to define a set of filtering areas which are successively advanced across the flow path for the plastic material, within the filter device; clamping and sealing means being provided for clamping the filter element peripherally around each filtering area within the filter chamber, the clamping means comprising a perforated head piston member which can be reciprocated along a longitudinal axis into the chamber of the filter device. The piston member has a flow passage therein opening at the front end into the filter chamber and on one side; the piston member may be reciprocated between a forward or advanced position, wherein a peripheral edge of the perforated head matingly engages with a circular rib at the outlet side of the filter chamber to sealingly clamp the filter element against a perforated back-plate to allow the molten plastic material to flow towards an outlet port, and a backward or retracted position wherein the perforated head piston disengage the filter element for the replacement of a clogged area with a fresh one, preventing the communication between the inlet and the outlet side of the flow path.

In this way a perfect seal of the filter element is ensured in a sample manner peripherally around each filtering area during use, letting the filter band to freely slide in absence of any locking action and tearing forces during any change.

According to a preferred embodiment of the present invention, the filter element is suitably embossed by the same piston member to form a circular pocket having a flat bottom wall resting against the perforated backplate; the particulate or contaminating material is therefore restrained into the pocket area of the filter element to progressively accumulate an agglomerate of considerable thickness of particulate material which adheres to the filter element and improves filtration; elimination of the contaminating material is also allowed avoiding any loss of plastic material during the change.

The present invention can be applied without any problem both to filtration devices having single or multiple flow-paths, in which two or more flow-paths or channels are arranged in parallel between an inlet and an outlet port, and in which a valve member allows the distribution of the flow of molten plastic material towards one or both of said flow-paths.

BRIEF DESCRIPTION OF THE DRAWINGS

The present invention will be now described in more detailed, with reference to the accompanying drawings, in which.

DETAILED DESCRIPTION OF THE INVENTION

With reference to FIGS. 1 to 5 will be now described a first embodiment of a filter device according to the invention.

Figure 1:
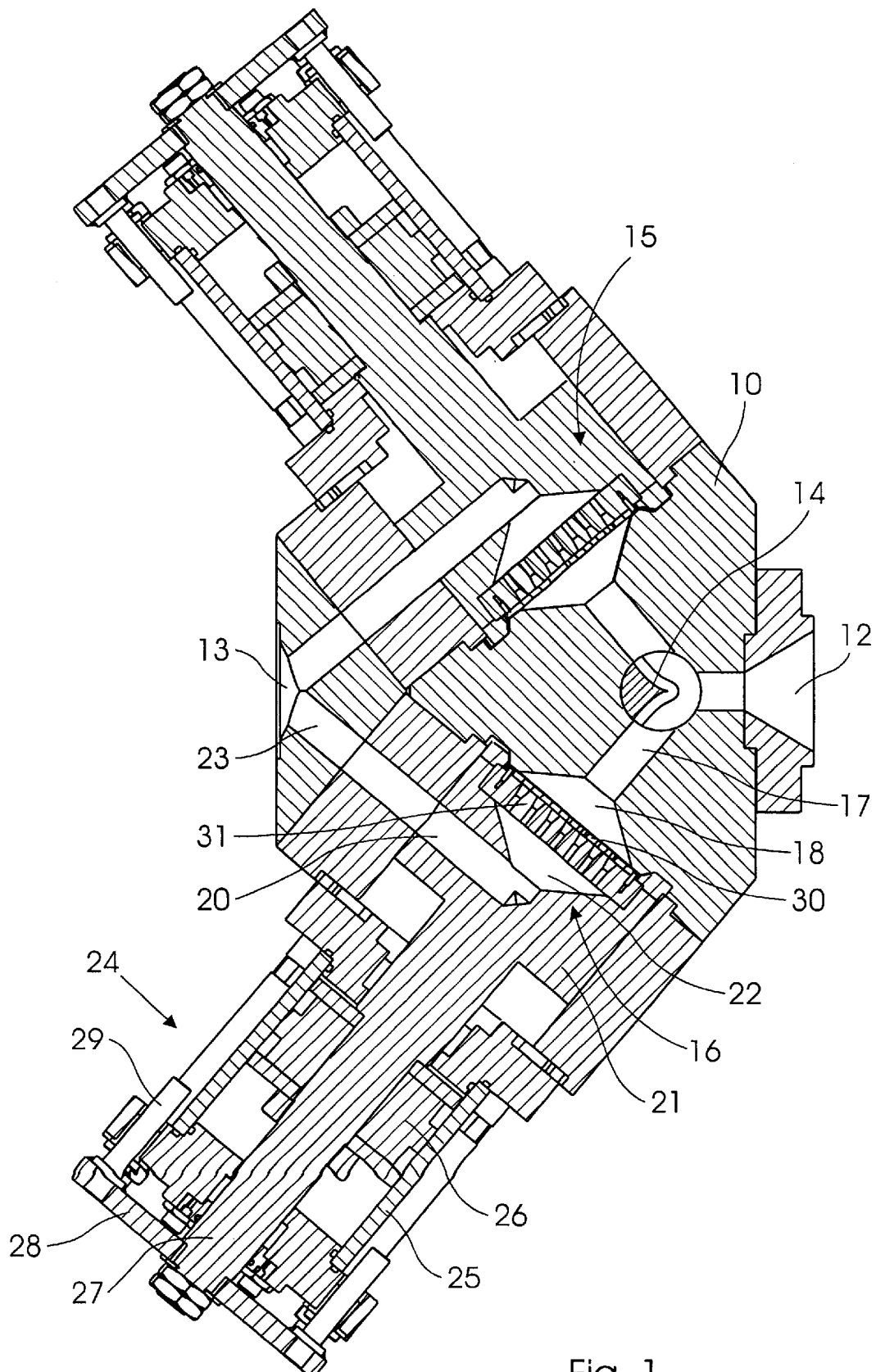
FIG. 1 shows a cross-sectional view of a first embodiment of a filter device according to the invention, having two flow-paths in the open condition.

As shown in FIG. 1, a filter device for separating particulate material from a stream of flowable plastic material, comprises a body 10 defining one or more chambers for housing filter bands 11 (FIG. 4) transversally extending across a corresponding flow-path, between an inlet 12 and an outlet 13 of the filter device.

In the case of FIG. 1, the body 10 of the filter device comprises two flow-paths for the molten plastic material to be processed, which extend in parallel between two sides of the device; a flow diverting valve member 14 is provided at the inlet 12 to stop the flow of material in respect of a selected one of the flow-paths.

Figure 2:
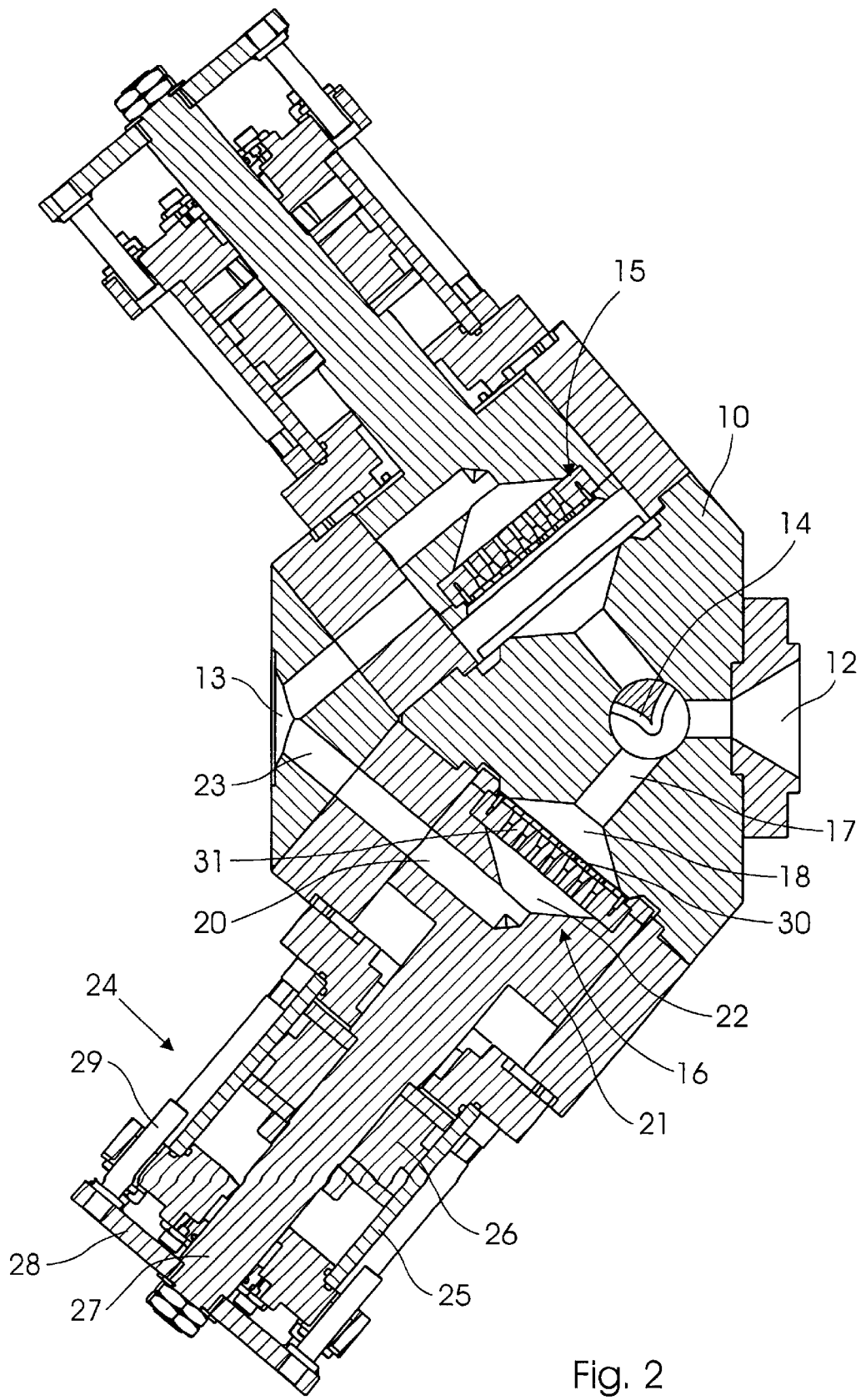
FIG. 2 shows the same filter device of FIG. 1 in which a flow-path is in a closed condition.
Figure 3:
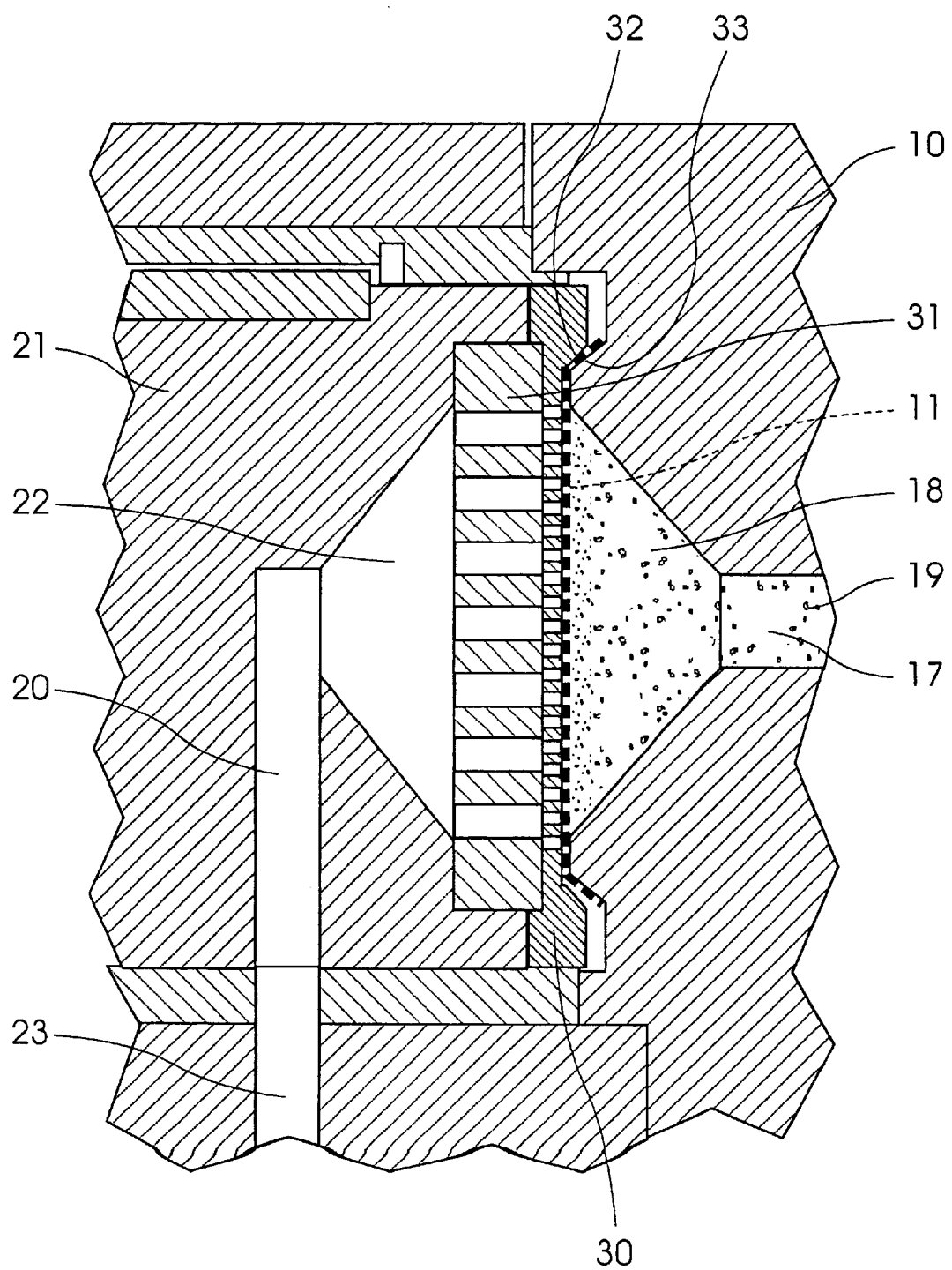
FIG. 3 shows an enlarged detail of the open flow-path of FIG. 2.
Figure 4:
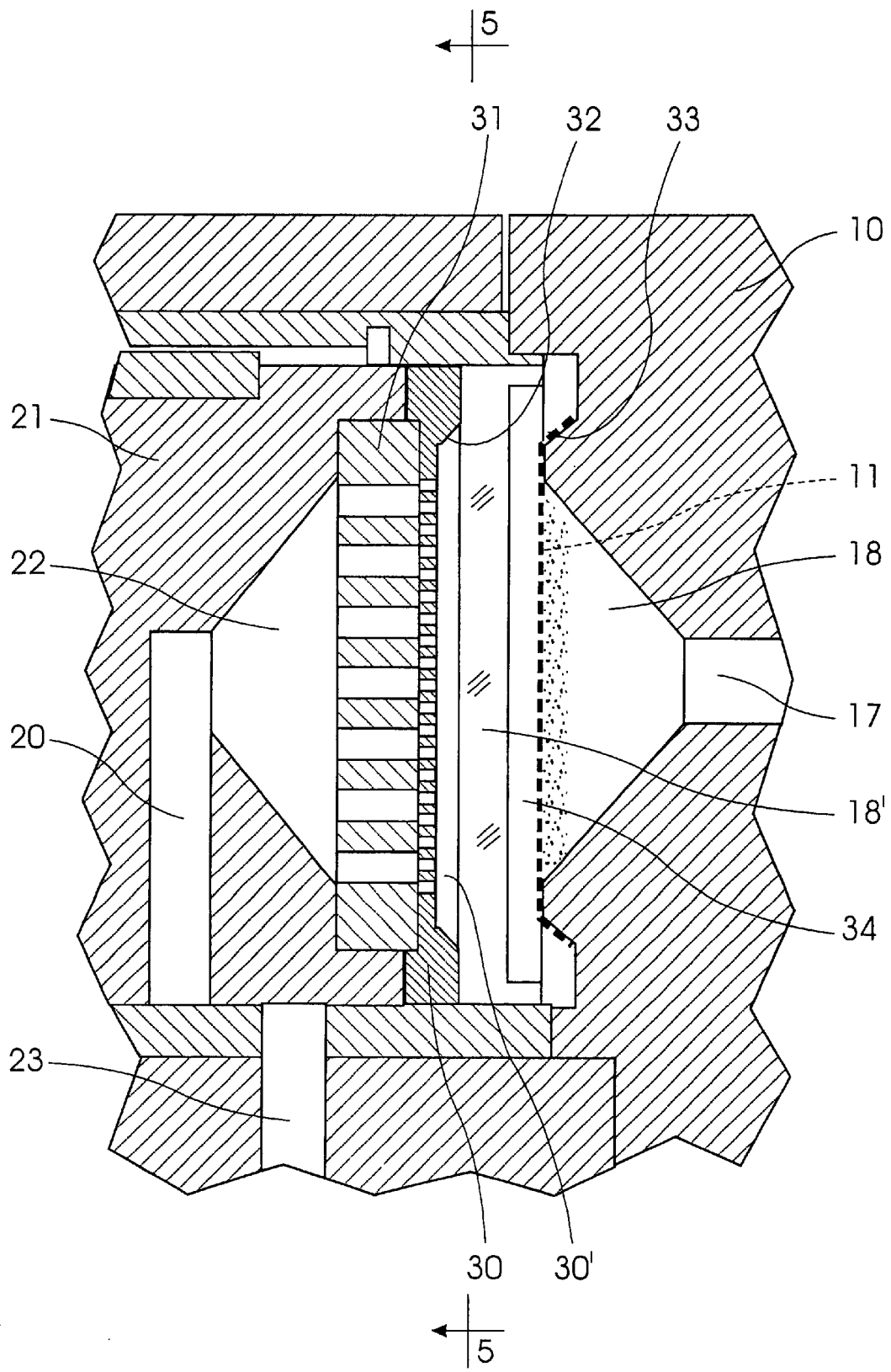
FIG. 4 shows an enlarged detail of the closed flow-path of FIG. 2.
Figure 5:
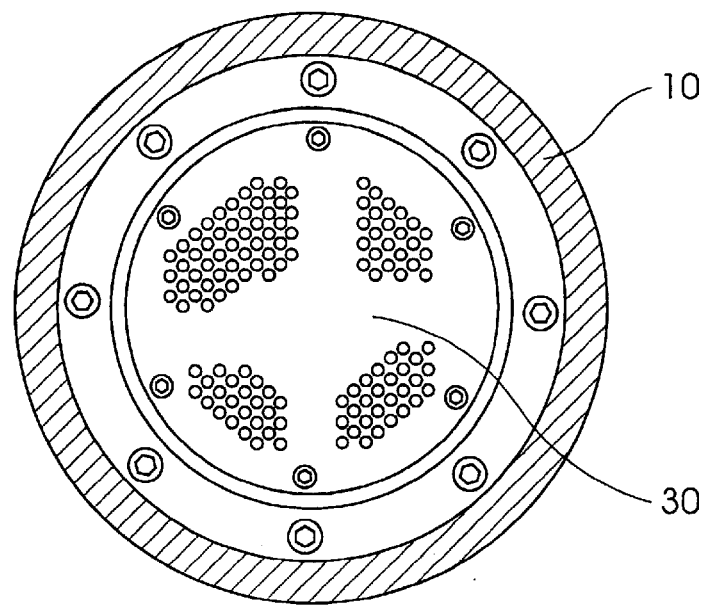
FIG. 5 shows a front view of the back-plate for the filter element, taken along line 5—5 of FIG. 4.

As shown in FIGS. 1 and 2 and in the detail of FIGS. 3 and 4, each flow-path 15 and 16 comprises a first channel portion 17 which leads into a filter chamber 18 of conical shape, having diverging wall at one end thereof. A filter member in the form of a continuous screen band 11, is extending into the filter chamber 18, across the flow-path for the material, to provide longitudinally spaced apart filtering areas, by advancing the filter band when a filtering area has been clogged by the particulate material 19 entrained by the stream of plastic material flowing along the path.

The flow-path comprises a second channel portion into a valving member 21 in the form of a cylindrical piston, axially reciprocable in the filter chamber 18 as shown in the upper side of FIG. 2, and in FIG. 4.

The second channel portion 20 radially extends into the piston member 21, from an enlarged cavity 22 at the front end of the piston member 21 facing the conical portion 18 of the chamber; the channel portion 20 laterally extends from the cavity 22 towards a third channel portion 23 in the body 10, connected to the outlet 13.

The valving member 21 may be controlled by an actuator 24 of any suitable type, to reciprocate between an advanced position, shown in FIGS. 1 and 3, in which the valving member 21 connects the channel portions 20 and 23 to allow the molten plastic material to flow from the inlet 12 to the outlet 13, and a retracted position in which the channel portions 20, 23 are disconnected preventing the flow.

In the example shown, the actuator 24 is in the form of a fluid actuate cylinder 25 having the piston 26 connected to the stem 27 of the valving member 21, which axially extends through a rear plate 28 provided with guide studs 29 to prevents rotation of the valving member 21 and the misalignment of channel portions 20 and 23.

The piston 21 of the valving member, at the fore end facing the inlet side 18 of the filter chamber, is provided with a circular shoulder for seating a perforated back-plate 30 and a rear plate 31 having perforations of larger diameter than the back-plate 30.

Clamping means for sealingly clamping and embossing the filter band 11 around the perforated area of the back-plate 30, are provided on facing surfaces of the back-plate 30 and the inlet side 18 of the filter chamber, as shown in FIGS. 3 and 4.

More specifically the clamping and sealing means comprises an annular rim 32 on the front face of the back-plate 30, respectively an annular rib 33 on a corresponding front face of the inlet end of the chamber 18, having slanted conical surfaces matingly engaging on opposite sides of the filter band 11 as shown in the appended drawing.

The annular members 32 and 33 perform three main functions: a first locking action to clamp the filter band 11 preventing the same to slide or to move under the pressure of the flowing plastic material; a second sealing action to prevent any leakage of material from the inlet and outlet apertures for the filter band 11, one of which is shown by reference 34 in FIG. 4; and a third embossing action for shaping the filter band 11 at each filtering area, in the form of a small deeply pocket having a flat bottom surface conforming to the circular cavity 30' on the front face of the back-plate 30.

The advantage of embossing a circular pocket at each filtering area, each time the piston 21 of the valving member is urged against the annular rib of the chamber 18, resides in the formation of a collecting space for the particulate material 19, upstream the filter band 11, in which the unwanted particles 19 to be filtered are retrained and progressively stored, improving the filtering action and allowing the removal of the same particles with the pocket when the filter band 11 is advanced to change a clogged area of the filter with a fresh one, without subjecting the band 11 to excessive shearing stress. Therefore a filter band 11 of a thin and cheap wire net, may be used instead of the strong and costly filter bands required by the previously known filter devices.

The working mode of the filter device according to the invention, will be now described with reference to FIGS. 1 to 4: when both pistons 21 of the valving members are maintained by the respective actuator 24 in the advanced position of FIG. 3, that is to say the filter device is in the open condition of FIG. 1, the filter bands 11 are tightly clamped and embossed against the protruding rib 33 at the inlet side of the filter chambers 18. The distribution valve 14 can then be arranged in the central position to allow the circulation of two parallel flows of plastic material, from the inlet 12 to the outlet 13, via the two flow-paths 15 and 16. The filter bands 11 thus exert their own filtering action on the molten material, retaining the impurities or particulate material 19 and allow the passage of a cleaned flow down stream the filter device.

When the need arises, indicated by an appropriate pressure detection device, to change a clogged area of a filter band 11, the respective actuator 24 performs the backward movement of the valving piston 21 so as to disengage the filter band 11, which can thus be moved forwards or step advanced in a cross-direction, transversely to the flow of material, for the replacement of a clogged area with a clean one provided by a subsequent portion of the continuous screen whereto the filtering areas belong. This situation is shown in FIG. 2 for one of the two filtering path, and in FIG. 4 of the drawings.

From FIG. 4 it is also clear how the pocket embossed into the filter band during any replacement of a clogged area, will remove a considerable thickness of the accumulated contaminating material which is so brought outside the filter device.

As shown in FIGS. 2 and 4, when the piston 21 of the valving member is in the backward position, the channel 20 is no longer in communication with the corresponding outlet channel 23, so that the communication between the inlet and outlet ports of the device, during replacement of a clogged area of the filter band 11, is prevented avoiding an undesirable back-flow of molten plastic material from the outlet 13 to the filter chamber 18.

Once a clogged area has been replaced, everything returns to the operative condition of FIG. 1.

Figure 6:
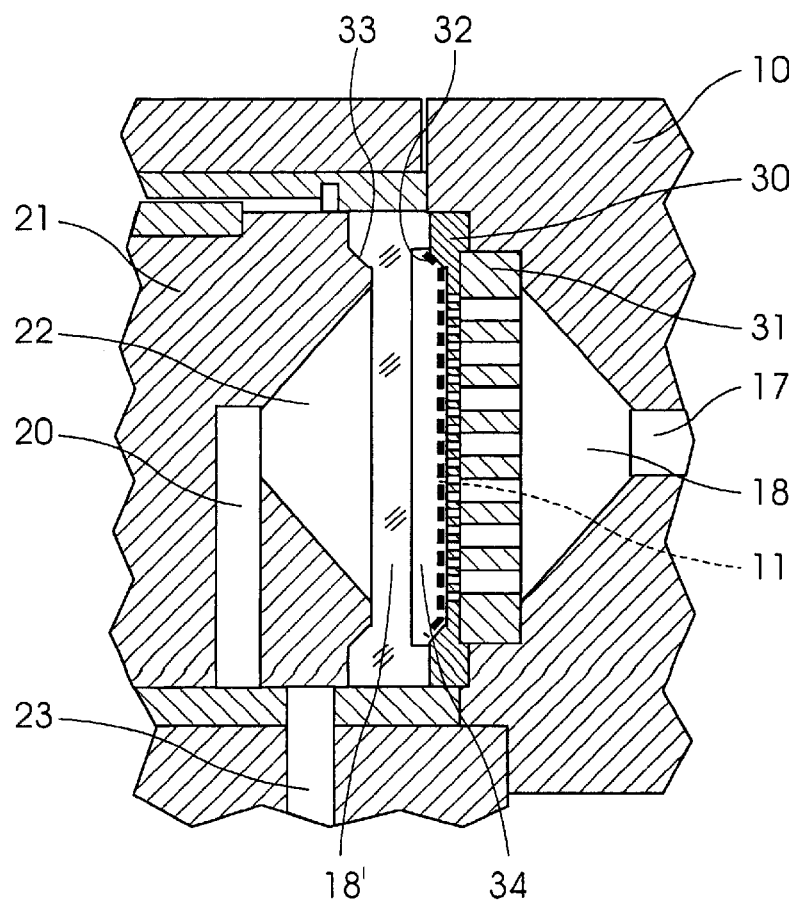
FIG. 6 shows a cross-sectional view for a second embodiment of the invention.

FIG. 6 of the drawing shows an enlarged detail similar to the previous FIGS. 3 and 4 for a second embodiment of the invention.

FIG. 6 substantially corresponds to the previous FIG. 4, differing for the disposition of the back-plate 30 and rear plate 31, the filter band 11 and the embossing ribs 32 and 33; therefore in FIG. 6 the same reference numbers have been used for corresponding or similar parts of the filter device of FIGS. 1 to 4. In FIG. 6 the inlet and outlet sides have been reversed disposing the plates 30, 31 in a corresponding seating of the body 10, at the outlet side of the chamber 18.

With reference now to FIGS. 7 to 10 a third embodiment of an apparatus according to the invention, comprising three filter devices will be described.

Figure 7:
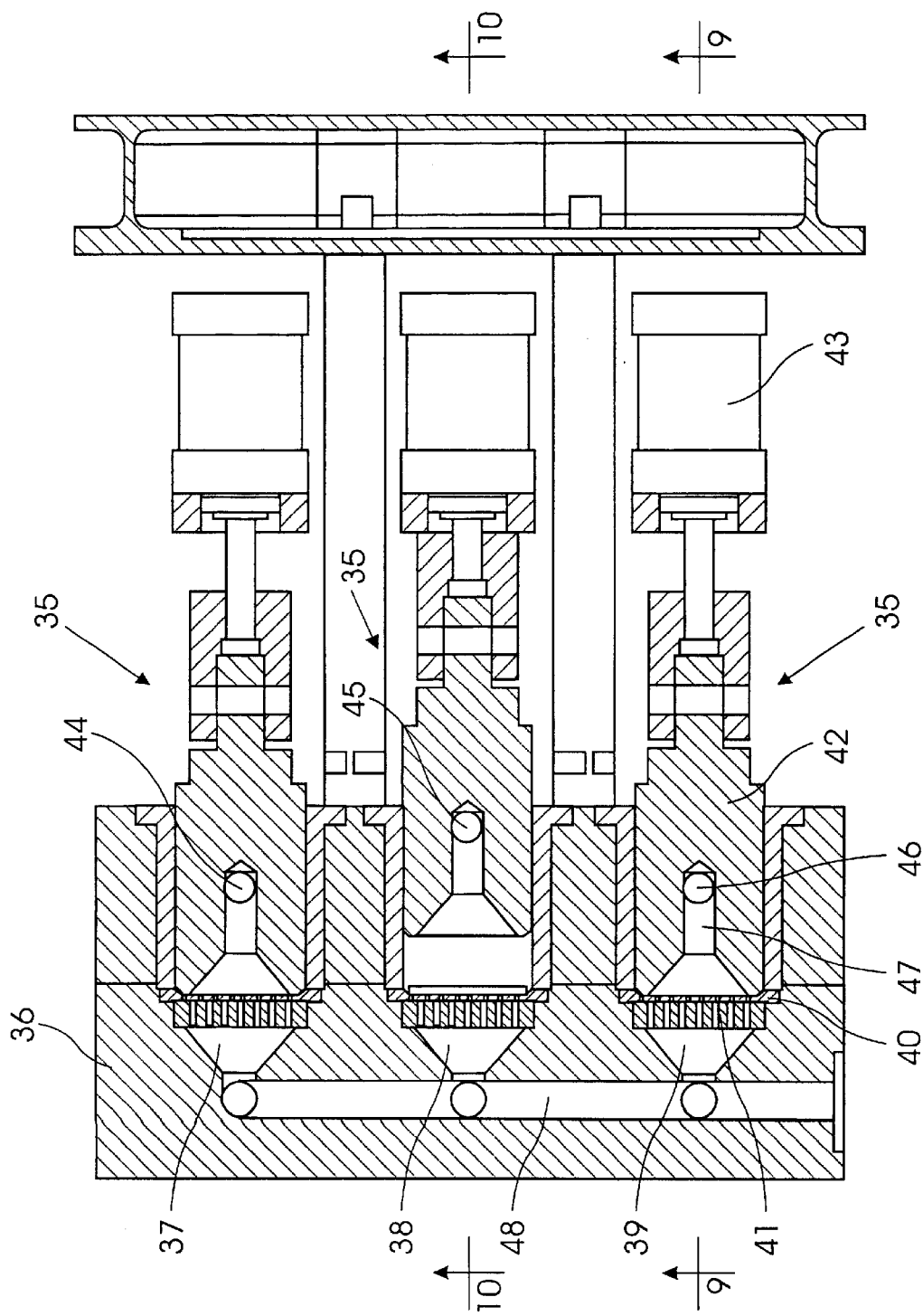
FIG. 7 shows a cross-sectional view of a third embodiment of the invention, comprising three flow-paths.

More precisely, as shown in FIG. 7, the apparatus comprises three filter devices 35 which are connected in parallel each other to define a corresponding number of flow-paths between the inlet and the outlet sides.

The apparatus comprises a body 36 having filter chambers 37, 38 and 39, each chamber provided for housing a perforated back-plate 40, and a perforated rear plate 41 to support a filter band, not shown, in the manner described for example in FIG. 6. Each filter device comprises again a valving member 42 in the flow-path of the flowable plastic material, which may be reciprocated by a respective control cylinder 43, between an advanced position, shown in FIG. 9, and a retracted position shown in FIG. 10.

The inlets 44, 45, 46 of the three filter devices 35, in the advanced condition of the respective valve member 42, are connected to an outlet conduit 48 by an intermediate flow channel 47 into the same valving member 42.

As in the previously described embodiments of FIGS. 1 to 6, each perforated back-plate 40 and the facing surface of the valving member 42 are provided with matingly engaging annular rims or ribs to seal and emboss the filter band.

Figure 8:
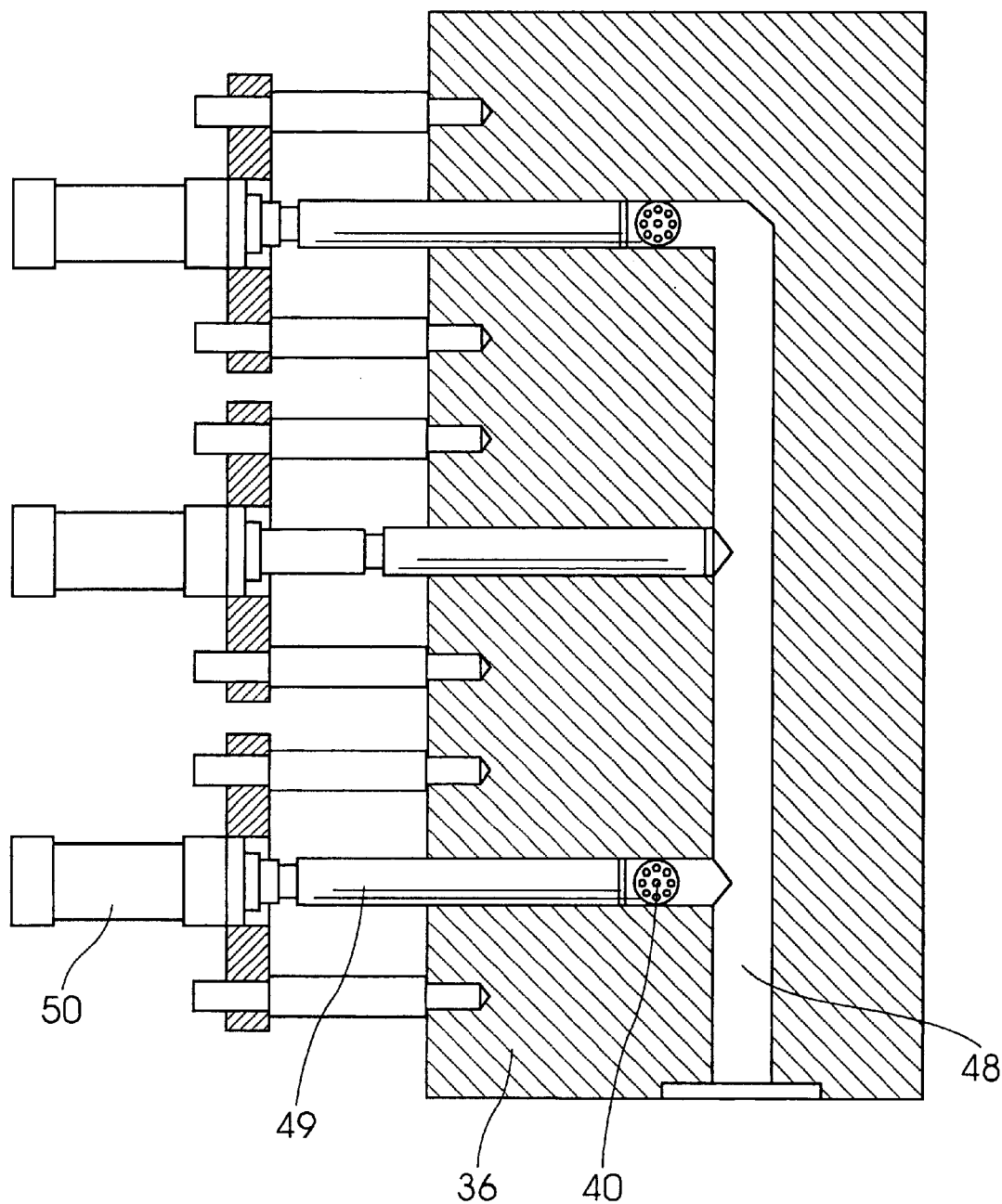
FIG. 8 shows a cross-sectional view along the line 8—8 of FIG. 7.
Figure 9:
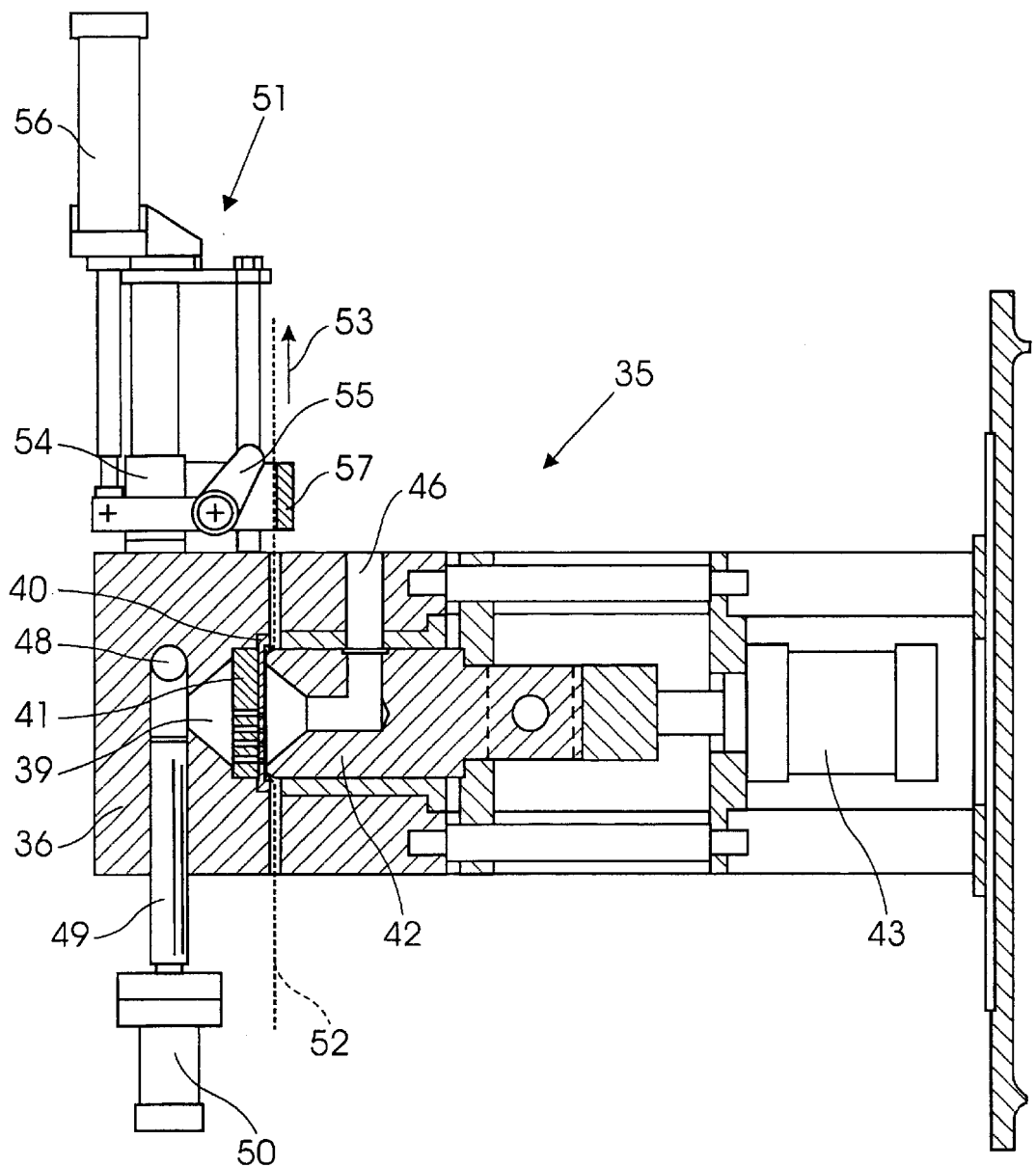
FIG. 9 shows a cross-sectional view along the line 9—9 of FIG. 7.
Figure 10:
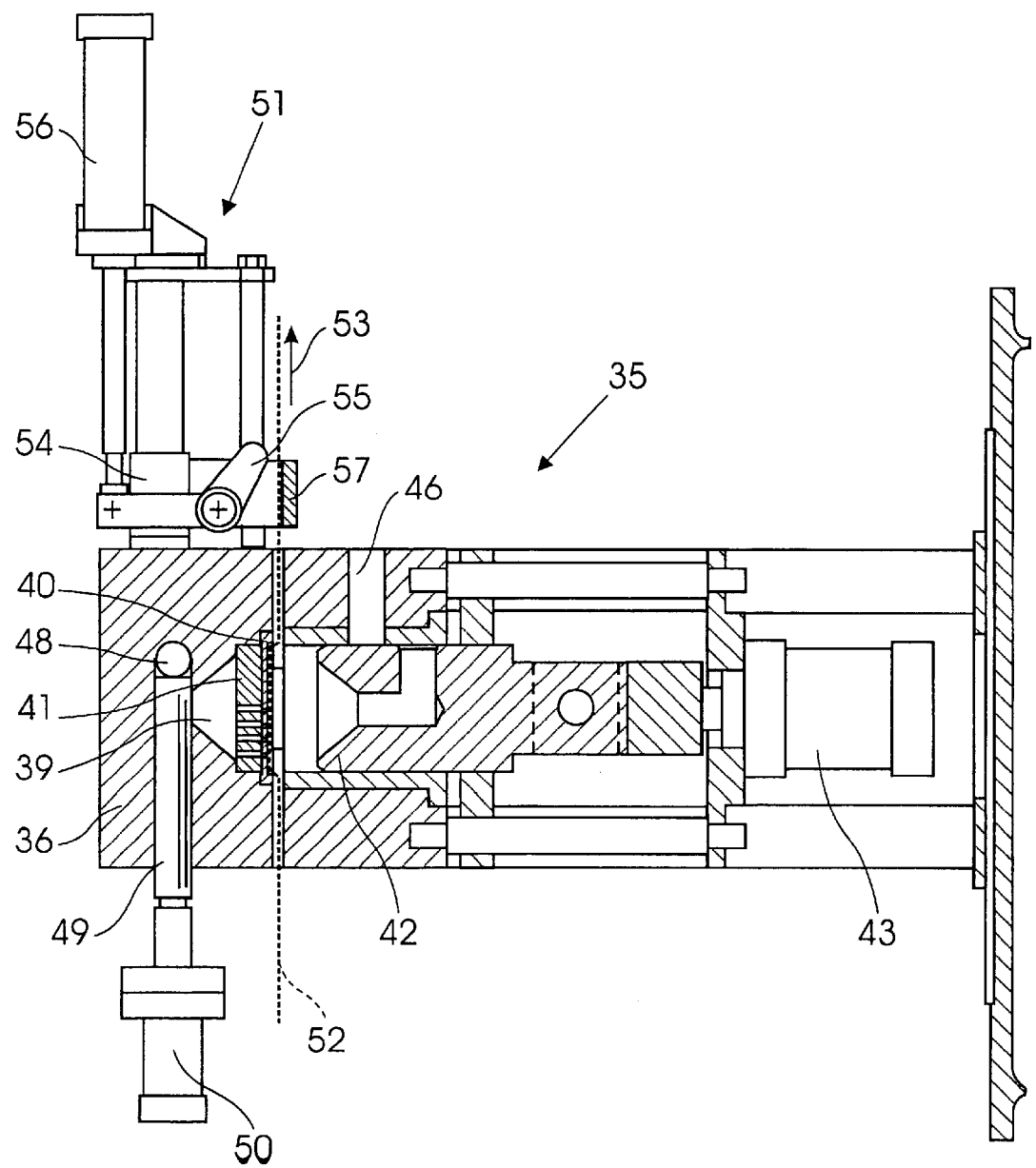
FIG. 10 shows a cross-sectional view along the line 10—10 of FIG. 7.

As shown in FIGS. 8, 9 and 10, the outlet port of each filter chamber 37, 38 and 39 may be closed or put in communication with the outlet channel 48, by moving a plug or closing member 49 which may be reciprocated by a respective control cylinder or actuator 50, between the retracted position of FIG. 9, in which opens for examples the filter chamber 39 towards the outlet channel 48, and the advanced position of FIG. 10, in which closes for examples the outlet of the filter chamber 39.

The advantage of FIGS. 7–10, in respect to the previous solution of FIGS. 1–5, resides in the possibility to have two filter devices constantly working, while the third filter device is closed to change the filter band as previously described in the example of FIGS. 1 to 5. Therefore, no perturbations or changes in the operative condition of the filter device, and in the flow of plastic material, will practically occur.

Finally, in FIGS. 9 and 10 a draw device 51 has been shown for the step advancing of the filter band 52, in the direction of the arrow 53 for each filter device of the apparatus of FIG. 7 or FIG. 1. The draw device 51 may be of any suitable type; for example may comprise a slider 54 movable on guide rods, having a swingable detent member 55 actuated by a control cylinder 56 to clamp the filter band 52 against a shoulder 57 of the same slider 54.

From the above and the described embodiments of FIGS. 1 to 10, it will be clear that the invention resides in a new and useful filter device, particularly suitable for automatic screen changes of continuous flow type, characterised by a minimum stay time for the polymer or plastic material during any filter change, and which make possible the use of filtering nets easily available, providing at the same time a wide filtering area to reduce to a minimum the back pressure, while maintaining to a minimum the loss of material.

What I claim is:

1. A continuous filter device for separating a particulate material from a stream of a flowable plastic material to be filtered, having the particulate material entrained therein, the filter device comprising:

a body member having inlet and outlet ports, and a flow path for the plastic material which extends between said inlet and outlet ports;

a filter assembly extending transverse to the flow path creating a first channel portion upstream of the filter assembly, and a second channel portion downstream of the filter assembly, said filter assembly comprising a continuous filter band slidably movable with respect to a perforated back plate;

a clamping means for sealingly clamping peripheral edges of a filtering area of the filter band against the back plate, said clamping means comprising a reciprocal valve member, said valve member comprising a piston member located in the second channel portion downstream of the filter band with a front face arranged parallel to the filter band, said piston member having a portion of the flow path extending thereinto and from a first end on a side of the valve member towards a second end at the front face of the piston member; and drive means to reciprocate the piston member between an advanced position in which the peripheral edges of the filtering area of the filter band are clamped to seal against the back-plate, and in which the portion of the flow path in the piston member is connected to a port, and a retracted position in which the portion of the flow path in the piston member is disconnected from the port, and which retracted position disengages the filter band from the back-plate to allow sliding of the filter band.

2. A filter device according to claim 1 wherein the body member comprises two flow-paths connected in parallel between the inlet and the outlet sides of the filter device, and a diverting valving member to deviate the flow of plastic material towards a selected one or both of the flow-paths of the filter device.

3. A filter device according to claim 2 comprising draw means for step advancing of the filter band, into a filter chamber in the body member of each flow-path.

4. A filter apparatus comprising a first, second and at least a third filter device according to claim 1, wherein said filter devices are connected in parallel to an outlet channel for the plastic material, and wherein plug members are provided for selectively closing the flow-path of each filter device in respect to the outlet channel of the filter apparatus.

5. A filter apparatus according to claim 4 wherein each plug member is connected to a respective actuator.

6. A filter device according to claim 1 wherein said valve member is in the form of a hollow cylindrical piston having a front cavity in said flow-path, flaring towards a filter chamber of the filter device.

7. A filter device according to claim 1 wherein the back-plate is disposed into a seating on the front face of the valve member inside a filter chamber disposed in the body member of the filter device.

8. A filter device according to claim 1 wherein the back-plate is disposed into a seating provided at one end of a filter chamber disposed in the body member of the filter device.

9. A filter device according to claim 1 wherein a front face of the back-plate is provided with an enlarged cavity facing one of ribs for embossing a pocket-shaped section on a filtering area of the filter band, making the pocket-shaped section adhere to the perforated area of the back-plate.

\* \* \* \* \*